June 19, 1962     H. G. THOMPSON     3,039,539
IMPLEMENT HITCH VERTICALLY ADJUSTABLE
Filed May 2, 1958     2 Sheets-Sheet 1

INVENTOR.
HOWARD G. THOMPSON
BY
ATTORNEYS.

June 19, 1962  H. G. THOMPSON  3,039,539
IMPLEMENT HITCH VERTICALLY ADJUSTABLE
Filed May 2, 1958  2 Sheets-Sheet 2
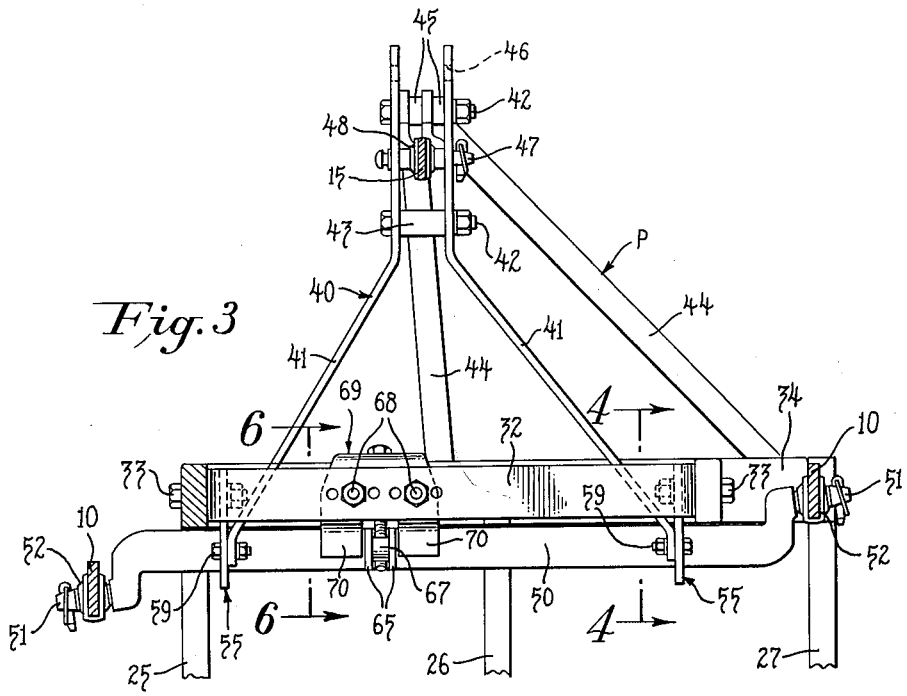
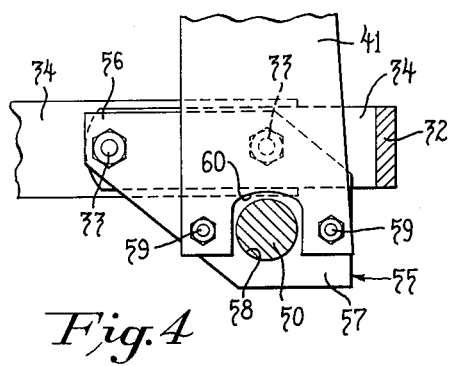
INVENTOR.
HOWARD G. THOMPSON
ATTORNEYS.

United States Patent Office 3,039,539
Patented June 19, 1962

3,039,539
IMPLEMENT HITCH VERTICALLY ADJUSTABLE
Howard G. Thompson, Livonia, Mich., assignor to Massey-Ferguson Inc., Racine, Wis., a corporation of Maryland
Filed May 2, 1958, Ser. No. 732,514
7 Claims. (Cl. 172—448)

The invention relates to plows and comparable ground working implements of the type adapted to be coupled to a tractor equipped with a power operated trailing hitch linkage and it is more particularly concerned with an improved hitch structure for coupling such implements to the tractor.

One object of the invention is to provide a hitch structure for implements of the above general character which is quickly and easily adjustable to adapt the implement for use with tractors of different sizes and particularly with tractors affording different degrees of ground clearance and having their hitch linkages located at different vertically spaced levels.

A more specific object is to provide an improved cross shaft mounting for plows and the like which permits the shaft to be located at either of two different levels and which provides simple efficient means for rotatably adjusting the shaft in either position.

It is also an object of the invention to provide a hitch in which the position of the connecting element adapted to cooperate with the top link of the tractor linkage is adjusted simultaneously with the adjustment of the cross shaft for cooperation with the draft links of a tractor of a particular size.

Other objects and advantages of the invention will become apparent from the following detailed description of the preferred embodiment illustrated in the accompanying drawings, in which FIGURE 1 is a side elevational view of a plow equipped with a hitch structure embodying the features of the invention, the hitch being shown adjusted for and coupled to a low clearance tractor.

FIG. 3 is a sectional view through the front end of the plow taken in a vertical plane substantially on the line 3—3 of FIG. 1.

FIG. 4 is a fragmentary sectional view taken in a vertical plane substantially on the line 4—4 of FIG. 3, showing elements of the hitch structure adjusted for use with a low clearance tractor.

FIG. 5 is a fragmentary sectional view similar to FIG. 4 showing the elements of a hitch structure adjusted for use with a high clearance tractor.

FIG. 6 is a fragmentary sectional view taken in a vertical plane substantially on the line 6—6 of FIG. 3.

While a single preferred embodiment of the invention and its application to an implement designed for use with a specific type of tractor has been shown by way of illustration, it is understood that this is not intended to limit the invention to that specific embodiment or application. On the contrary, the intention is to cover all modifications and adaptations falling within the spirit and scope of the invention as expressed in the appended claims.

By way of orientation in the art, the ground working implement herein shown, in this case, a plow, is designed for coupling to a tractor equipped with what is commonly known as a "Ferguson" hitch linkage. Such tractors are now manufactured in different sizes characterized, among other things, by having different amounts of clearance between the tractor body and the ground. Hitch linkages for both high and low clearance tractors are basically alike, although certain elements such as the draft and control links may differ in length and, of course, their operative connections with the tractor are located at different vertical levels.

Figure 1:
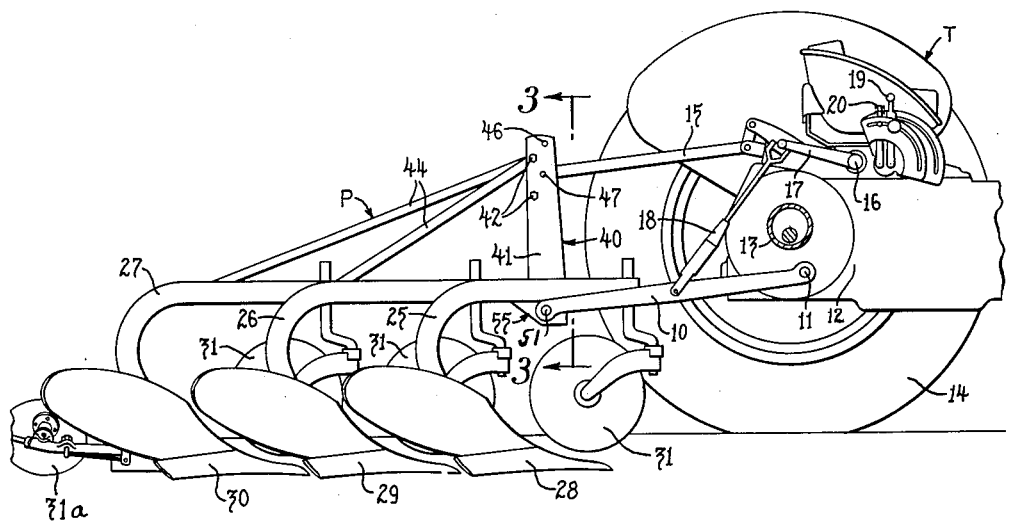

A hitch linkage of the above type is shown in FIG. 1 as applied to a typical low clearance tractor T. The linkage includes a pair of laterally spaced lower or draft links 10 having their forward ends universally pivoted as at 11 on the center housing 12 of the tractor. At their rear ends the draft links are fitted with suitable coupling elements cooperating with coupling elements on an implement for operatively connecting the implement to the tractor. The pivots 11 for the draft links are located below and somewhat forwardly of the axle housings 13 which carry the tractor rear drive wheels 14. The linkage also includes a top or control link 15 by which controlling forces are transmitted from the implement to the control system of the tractor.

Figure 2:
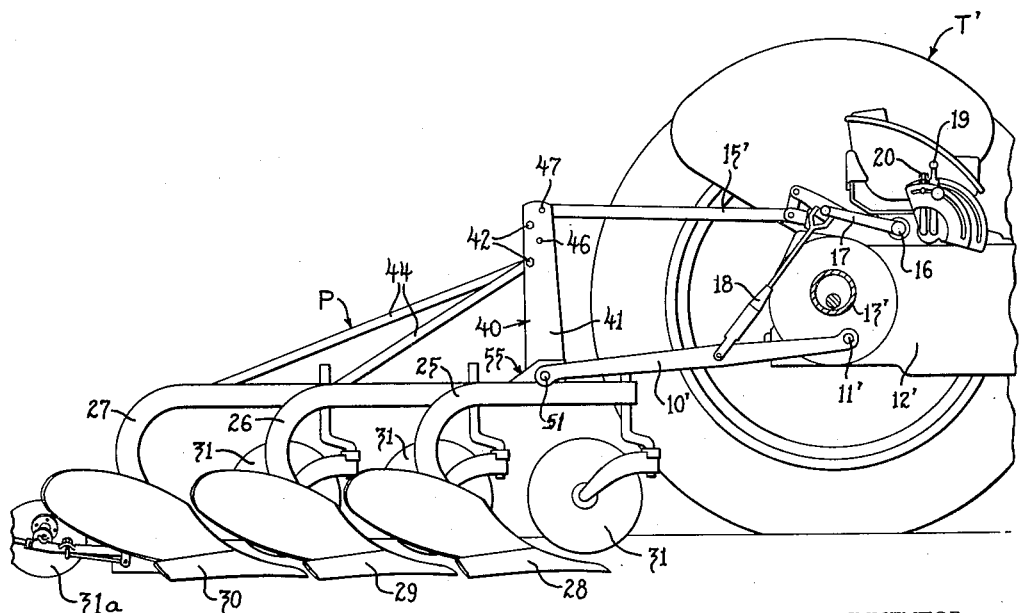
FIG. 2 is a side elevational view similar to FIG. 1 showing the hitch structure adjusted for and coupled to a high clearance tractor.

For application to a high clearance tractor T' such as that shown in FIG. 2, somewhat longer draft links 10' and a longer control link 15' are required. The draft links are pivoted at 11' on the tractor center housing 12' in the same relation to the axle housing 13' as in the low clearance tractor. It will be observed, however, that the pivots 11' are located at a substantially higher level than the pivots 11.

Tractors of the type shown are equipped with power operated mechanism, usually hydraulic, for raising and lowering the draft links and the implement attached thereto. The power mechanism is enclosed in the tractor body and operates through a lift shaft 16 journaled on the body and having lift arms 17 at opposite ends connected to the draft links by drop links 18. Operation of the mechanism to raise or lower the linkage and attached implement is controlled manually by means of a hand lever 19. In the exemplary tractor the depth at which the implement operates is determined by the setting of an auxiliary lever 20 and is automatically controlled by forces transmitted from the implement through the control link 15 or 15'.

The implement P shown in association with the tractor in FIGS. 1 and 2 is a three-bottom plow. It includes three plow beams 25, 26 and 27 of progressively varying length extending in a generally fore-and-aft direction. Each beam has a depending leg at its rear end portion for attachment of a plow base, the beams of the exemplary plow being fitted respectively with plow bases 28, 29 and 30. Conventional coulters 31 are supported in leading relation to each of the plow bases and the usual furrow wheel 31a is supported in trailing relation to the rearmost plow base.

The plow beams are connected to form a rigid unitary structure. The connection is provided, in this instance, by a series of transverse members including a front member 32 having its ends turned back and secured as by bolts to the front end portion of the plow beam 25 and to an offset member 34 which may be formed integrally with or secured to the plow beam 27. The beams and cross members thus form a rigid frame structure.

Suitable coupling elements are provided on the implement for connection with the hitch linkage of a tractor. Thus, for connection with the top link 15 of the hitch linkage, there is provided an upright strut 40 formed in this instance by a pair of elongated bars 41. As shown in FIG. 3 the end portions of the bars are offset to lie in spaced parallel planes, the spacing being such that when the lower ends are attached to the implement frame, the upper ends are brought relatively close together.

Preferably, the upper ends of the strut bars 41 are secured together as by upper and lower bolts 42, the lower of which is fitted with a tubular spacer 43 for holding the bars in the desired space relation. The upper bolt 42 serves as an anchorage for a pair of brace bars 44 which extend downwardly and rearwardly for attachment to the implement frame to hold the strut rigidly in upright position. Spacers 45 are provided on the upper bolt for properly spacing the brace bars and the strut bars 41.

Alined apertures 46 are provided in the bars 41 for reception of a connecting element such as a pin 47 adapted to be received in the connecting element 48 conventionally provided at the trailing end of the top hitch link 15. This element is usually in the form of an apertured ball socketed in the link to permit universal pivotal movement of the pin 47 relative to the link. If desired, a plurality of sets of holes 46 may be provided in the strut bars located at different levels to permit changing the angular relationship of the strut and the top link to meet varying operating requirements.

For connection with the lower or draft links 10 of the tractor hitch linkage, the implement frame is provided with a sturdy cross shaft 50. Integrally formed pins 51 project at opposite ends of the cross shaft for engaging in coupling elements 52 carried at the trailing ends of the draft links. Those coupling elements also are apertured balls socketed in the links for universal movement. As shown in FIG. 3, the pins 51 are offset in opposite directions from the axis of the cross shaft to provide for leveling the implement when the tractor is operated with the wheels at one side in a previously plowed furrow.

The posture of the ground working elements of the implement, in this case, the plow bases 28, 29, 30, as the implement is raised or lowered by the linkage through the lower range of its travel is of the utmost importance. Thus, at ground level the plow bases should incline forwardly to provide sure and rapid penetration as the implement moves ahead. On reaching an average working depth, the plow bases should be substantially level to minimize any tendency to depart from that depth. Plow base posture is determined by the geometry of the hitch linkage, particularly by the length of the links and the location of their pivots which, of course, are fixed for any particular tractor. Accordingly, an implement having hitch coupling elements permanently positioned for efficient operation with a tractor of one size is not adapted for operation with a tractor of a different size.

In accordance with the present invention, provision is made for mounting the strut 40 and cross shaft 50 on the implement so that the hitch coupling elements, that is the pins 47 and 51, may be presented at either of two selected levels affording proper implement posture with high and low clearance tractors respectively. For this purpose the mounting of the cross shaft is effected by means of a pair of reversible brackets 55 adapted to be removably secured to the implement frame, in this instance, to the frame side members 25 and 34.

The brackets 55 are alike, each preferably comprising a heavy metal plate defining an anchoring portion 56 and a load bearing portion 57 offset from the anchoring portion. The anchoring portion of the bracket is suitably apertured for the reception of bolts by which it is removably attached to the implement frame, the exemplary bracket having apertures spaced apart to receive the bolts 33 by which the front frame member is secured to the side members.

The load bearing portion 57 of each bracket 55 is provided with bearing means herein shown as an aperture 58 for receiving and confining the cross shaft 50. As will be seen by reference to FIGS. 4 and 5 of the drawings, the aperture 58 is offset at one side of the anchoring portion of the bracket so that the cross shaft will lie either below or above a reference plane depending upon the position in which the brackets are secured to the frame. In the exemplary embodiment, the apertures 58 are offset sufficiently to locate the cross shaft either above or below the implement frame as shown in FIGS. 4 and 5.

As shown in FIGS. 3–5 the load bearing portion 57 of each bracket is also apertured for the reception of bolts 59 by which the strut members 41 are rigidly secured to the brackets. Preferably the apertures for those bolts are located in a common plane with aperture 58 and the ends of the strut members are notched as at 60 to afford clearance for the cross shaft.

When the implement is to be used with a low clearance tractor such as that shown in FIG. 1, the brackets are attached to the implement frame with their load bearing portions 57 depending below the frame. The cross shaft 50 and its coupling elements 51 are then properly positioned for imparting the correct posture to the implement when connected to the hitch linkage of a low clearance tractor. To condition the implement for operation with a high clearance tractor such as that shown in FIG. 2, it is only necessary to reverse the brackets 55. Thus, the brackets may be mounted with their load bearing portions 57 projecting above the frame as shown in FIG. 5, thereby locating the cross shaft 50 and its coupling elements 51 at the higher level required by the higher position of the hitch link pivots.

Since the strut members 41 are mounted on the implement frame through the medium of the brackets 55 the level at which the coupling element or pin 47 is presented is automatically adjusted by the positioning of the brackets. Further adjustment is made possible by the provision of additional sets of pin receiving holes 46 in the strut members so that the control link 15 may be connected in precisely the proper angular relation to the implement.

The invention also provides simple, yet effective, means for rocking the cross shaft 50 about its longitudinal axis to adjust its angular position. Since the coupling pins 51 are offset relative to the axis of the shaft, such rotation of the cross shaft serves to change the angle of the implement relative to the tractor as viewed from above. The implement may thus be accurately "steered" for proper lateral positioning.

The adjusting means in its preferred form comprises a pair of short rigid arms 65 welded or otherwise suitably secured to the shaft 50 to project radially therefrom in spaced parallel relation. The arms are suitably apertured as at 66 to rotatably support a shaft 67 which has a diametrically disposed threaded hole intermediate its ends.

Mounted on the frame member 32 of the implement as by bolts 68 is a bracket 69 having its lower end bifurcated to define spaced legs 70 adapted to extend along opposite sides of the arm 65. The legs 70 are thus effective to restrain the cross shaft 50 against the endwise movement and also to retain the shaft 67 in place in the arms.

As shown in FIG. 6, the upper end portion 71 of the bracket 69 is bent over and apertured to accommodate a bolt or screw 72 adapted to be screwed into the transverse hole in the shaft 67. The bolt has a head 73 which in cooperation with a pair of lock nuts 74 securely clamps it to the bracket and restrains it against either endwise or rotational movement. Thus, with the lock nuts backed off, the cross shaft 50 may be rocked in either direction by screwing the bolt 72 into the threaded hole in the shaft 67. The lock nuts may then be tightened up to retain the parts in adjusted position.

It will be apparent from the foregoing that the invention provides a hitch structure of novel and advantageous construction for coupling a ground working implement to tractors of different sizes. By a simple practical adjustment, the coupling elements of the hitch may be located at a level effective to impart the proper posture to the implement when it is coupled to either a high clearance or a low clearance tractor. The invention also provides novel means by which the angular position of the coupling elements may be quickly and easily adjusted to vary the lateral placement of the implement relative to the tractor. The improved hitch structure is simple in construction, extremely rugged and durable and easy to adjust for use with tractors of different sizes.

I claim as my invention:

1. An implement for use with tractors having trailing hitch linkages including laterally spaced lower draft links and an upper control link, said implement comprising, in combination, a rigid frame supporting a ground working tool, a cross shaft having coupling means at opposite ends for engagement with the draft links of a tractor hitch linkage, an upright strut having means for connection with the control link of the hitch linkage, means for securing said cross shaft and said strut to said frame so as to locate the coupling means at either of two selected vertically spaced levels, said securing means including a pair of reversible brackets apertured to receive said cross shaft, means securing said brackets to the frame with said apertures located either above or below a reference plane, and means securing said struts to the brackets in the vicinity of said aperture.

2. An implement for use with tractors having trailing hitch linkages including laterally spaced lower draft links and an upper control link, said implement comprising, in combination, a rigid frame supporting a ground working tool, a cross shaft having coupling means at opposite ends for engagement with the draft links of a tractor hitch linkage, an upright strut having means for coupling with the control link of the hitch linkage, means for securing said cross shaft and said strut to said frame including a pair of brackets connected with the shaft and with the strut, said brackets being removably secured to the frame along a line offset from their connections with the cross shaft and strut, and said brackets being reversible to locate the coupling means of the cross shaft and strut at either of two vertically spaced levels.

3. An implement for use with tractors having trailing hitch linkages including laterally spaced lower draft links and an upper control link, said implement comprising, in combination, a rigid frame supporting a ground working tool, a cross shaft having coupling means at opposite ends for engagement with the draft links of a tractor hitch linkage, an upright strut having means for coupling with the control link of the hitch linkage, a pair of brackets each having an attaching portion bolted to the frame and a bearing portion offset at one side of said attaching portion, said bearing portion being formed with bearing means for receiving said cross shaft and having apertures for attachment of an element of said strut, said brackets being reversible to locate said bearing portion above or below the bolts attaching the brackets to the frame.

4. A tractor mounted plow for use with high or low clearance tractors having trailing pivoted hitch links, said plow including a plurality of plow beams each having a depending rear portion carrying a plow base, a frame structure including spaced side members and cross members connected to form a rigid unit, a cross shaft having pins at opposite ends for connection with a pair of the hitch links, a pair of strut members having their ends spaced apart and carrying means for connection with another of the hitch links, a pair of brackets, each having an anchoring portion apertured for bolting to the side members of the frame, and a shaft engaging portion integral with said anchoring portion apertured to receive said cross shaft and for bolting to one of said strut members, said brackets being reversible to locate the cross shaft and strut members in position to impart the proper posture to the plow when connected with either tractor.

5. An implement for use with tractors having trailing hitch linkages including laterally spaced draft links and an upper control link, said implement comprising, in combination, a frame, a cross shaft supported on said frame for limited rotation about its longitudinal axis, coupling pins rigid with and extending from opposite ends of said shaft for cooperation with the tractor draft links, said pins being offset at opposite sides of the axis of the shaft whereby the implement may be shifted relative to the tractor by rotation of said shaft, a pair of rigid arms projecting radially from said shaft, a bracket secured to said frame having legs projecting alongside said arms to restrain the shaft against axial movement, a nut element carried by said arms, and a threaded member anchored to said bracket and cooperating with said nut element to adjust the angular position of said shaft.

6. An implement for use with tractors having trailing hitch linkages including laterally spaced lower draft links, said implement comprising, in combination, a rigid frame supporting a ground working tool, a cross-shaft having rigid coupling pins extending from opposite ends for cooperation with the tractor draft links, said pins being offset at opposite sides of the axis of the shaft whereby the implement may be shifted relative to the tractor by rotation of the shaft, a pair of brackets rotatably supporting said shaft reversibly attachable to said frame to locate the shaft either above or below the frame, a pair of rigid arms projecting radially from said shaft, another bracket having a pair of legs spaced apart to straddle said arms, a nut element carried by said arms, a threaded member rotatable relative to said other bracket and secured against axial movement relative thereto, and means for securing said other bracket to said frame in either of two positions to locate said legs for cooperation with the arms on said shaft and said threaded member for cooperation with said nut in either of the two positions of the shaft.

7. An implement for use with tractors having trailing hitch linkages including laterally spaced lower draft links, said implement comprising, in combination, a rigid frame supporting a ground working tool, a cross-shaft having rigid coupling pins extending from opposite ends for cooperation with the tractor draft links, said pins being offset at opposite sides of the axis of the shaft whereby the implement may be shifted relative to the tractor by rotation of the shaft, a pair of brackets rotatably supporting said shaft reversibly attachable to said frame to locate the shaft either above or below the frame, and mechanism interposed between said shaft and said frame operable to adjust the angular position of the shaft about its axis and to retain the shaft in an adjusted position, said mechanism including a member attachable to the frame in either of two positions to adapt the mechanism for cooperation with the shaft when located above or below the frame.

References Cited in the file of this patent

UNITED STATES PATENTS

| 2,465,641 | Gardner | Mar. 29, 1949 |
| 2,539,666 | Jirsa et al. | Jan. 30, 1951 |
| 2,562,486 | Denning | July 30, 1951 |
| 2,644,694 | Briscoe | July 7, 1953 |
| 2,654,613 | Blair | Oct. 6, 1953 |
| 2,704,019 | Altgelt | Mar. 15, 1955 |
| 2,720,930 | Newhouse et al. | Oct. 18, 1955 |
| 2,766,674 | Hedquist et al. | Oct. 16, 1956 |
| 2,775,175 | Du Shane | Dec. 25, 1956 |
| 2,775,180 | Du Shane | Dec. 25, 1956 |
| 2,787,847 | Arps | Apr. 9, 1957 |
| 2,797,627 | Anderson | July 2, 1957 |
| 2,847,232 | Graham | Aug. 12, 1958 |

FOREIGN PATENTS

| 81,575 | Denmark | July 30, 1956 |